United States Patent [19]

Gaul

[11] Patent Number: 5,413,729
[45] Date of Patent: May 9, 1995

[54] COMPOSITION CONTAINING LACTONE AND ESTER FOR REMOVING COATINGS

[75] Inventor: Kimberley A. Gaul, St. Paul, Minn.

[73] Assignee: Minnesota Mining and Manufacturing Company, St. Paul, Minn.

[21] Appl. No.: 156,874

[22] Filed: Nov. 23, 1993

Related U.S. Application Data

[63] Continuation of Ser. No. 847,376, Mar. 6, 1992, abandoned.

[51] Int. Cl.$^6$ ................................................. C09D 9/00
[52] U.S. Cl. .................................. 252/162; 252/170; 252/364; 252/DIG. 8
[58] Field of Search ............... 252/162, 158, 142, 153, 252/170, 364, DIG. 8

[56] References Cited

U.S. PATENT DOCUMENTS

| | | | |
|---|---|---|---|
| 2,438,038 | 3/1948 | Craver | 252/170 |
| 2,438,638 | 3/1948 | Craver | 252/170 |
| 3,615,825 | 10/1971 | Gansser | 134/38 |
| 3,681,250 | 8/1972 | Murphy | 252/158 |
| 3,954,648 | 5/1976 | Belcak et al. | 252/158 |
| 3,972,839 | 8/1976 | Murphy | 252/548 |
| 4,120,810 | 10/1978 | Palmer | 252/153 |
| 4,508,634 | 4/1985 | Elepano et al. | 252/163 |
| 4,767,564 | 8/1988 | Kitchens et al. | 252/170 |
| 4,780,235 | 10/1988 | Jackson | 252/170 |
| 4,812,255 | 3/1989 | Suwala | 252/142 |
| 4,836,950 | 6/1989 | Madsen et al. | 252/153 |
| 4,927,556 | 5/1990 | Pokorny | 252/173 |
| 5,006,279 | 4/1991 | Grobbel et al. | 252/542 |
| 5,011,621 | 4/1991 | Sullivan | 252/162 |
| 5,015,410 | 5/1991 | Sullivan | 252/162 |
| 5,030,290 | 7/1991 | Davis | 134/4 |
| 5,035,829 | 7/1991 | Suwala | 252/170 |
| 5,049,300 | 9/1991 | Fusiak et al. | 252/162 |
| 5,098,592 | 3/1992 | Narayan et al. | 252/162 |
| 5,106,525 | 4/1992 | Sullivan | 252/162 |
| 5,215,675 | 6/1993 | Wilkins et al. | 252/100 |

FOREIGN PATENT DOCUMENTS

| | | |
|---|---|---|
| 0327290 | 8/1989 | European Pat. Off. . |
| 670832A5 | 7/1989 | Switzerland . |
| 2172304A | 9/1986 | United Kingdom . |
| 2172304 | 9/1986 | United Kingdom . |
| 2191501 | 12/1987 | United Kingdom . |
| WO87/07628 | 12/1987 | WIPO . |

*Primary Examiner*—Arthur C. Prescott
*Attorney, Agent, or Firm*—Gary L. Griswold; Walter N. Kirn; Robert W. Sprague

[57] ABSTRACT

The present invention comprises a composition for removing coatings such as paints from substrates which comprises at least one ester and at least one lactone. The present invention further comprises a method for removing coatings.

6 Claims, No Drawings

COMPOSITION CONTAINING LACTONE AND ESTER FOR REMOVING COATINGS

This is a continuation of application Ser. No. 07/847,376 filed Mar. 6, 1992, now abandoned.

FIELD OF THE INVENTION

This invention relates to removing paint and/or coatings. In particular, this invention relates to compositions for removing paint and/or coatings.

BACKGROUND OF THE INVENTION

It is often desirable to remove deposits from a substrate in order to clean the substrate. For example, U.K. Patent No. 2,172,304 (Tsukada) discloses a composition used to remove thermoplastic resins and residues such as acetal and thermoplastic polyesters resins. Generally, acetal and thermoplastic polyester resins are used as materials in molding processes such as injection molding to form objects such as steam iron housings, automotive electrical switches and television cathode-ray tube sockets. Tsukada's preferred composition comprises a $\beta$-, $\gamma$- or $\delta$-lactone mixed with an alcohol. Tsukada also mentions that the lactones can be mixed with an ester, in particular ethyl acetate, instead of an alcohol.

In addition for the need to remove acetal and thermoplastic polyesters resins and their residues, there is a need to remove paints and/or coatings from a substrate for a variety of reasons such as repainting or refinishing the substrate. Paints and/or coatings include conventional paints, varnishes, enamels, lacquers, water emulsion finishes and non-aqueous dispersions. The term "coating" hereinafter applies to both paints and coatings.

Coatings can be removed in a number of different ways. For example, they can be physically removed by use of a scraper or power sander or they can be chemically removed. However, methods utilizing chemical compositions have achieved considerable popularity because they are much easier to use than the non-chemical alternatives.

The chemical compositions used to remove coatings broadly fall within three general classes: (1) the alkali or acid class, (2) the organic solvent class and (3) the waterbased class. The first class generally comprises alkalis or acids which attack the coating by the chemical action of the ingredients thereof. Representative examples of this class are described in U.S. Pat. Nos. 3,681,250, 3,615,825 and 3,972,839. These alkali or acid compositions are undesirable because they often exhibit deleterious effects on wood or because they require considerable after treatment to insure the compositions complete removal from the treated surface.

The second class of chemical compositions used to remove coatings generally comprises solvent based compositions which rely upon the solvent power of the composition to dissolve or at least soften the coating. Representative examples of compositions of the second class include aromatic hydrocarbons, lower aliphatic esters, ketones, alcohols, chlorinated solvents such as methylene chloride or similar organic solvents. Many of the lower molecular weight solvents are undesirable because they are too volatile and thus, readily evaporate once applied to the surface. Other solvents are highly flammable thereby posing handling and shipping problems. In addition to posing application and handling problems, some of these organic solvents are undesirable because of their adverse effects upon the atmosphere and their toxicity.

Therefore, attempts have been made to overcome some of the problems associated with the solvent based compositions. Higher molecular weight solvents including higher aliphatic esters have been used to overcome some of the problems associated with the lower molecular weight solvents. For example, U.S. Pat. No. 4,120,810 (Palmer) discloses a paint remover which comprises an aromatic hydrocarbon and a second component which can include n-methyl-2-pyrrolidone or chemical analogs thereof, diacetone alcohol, or butyrolactone. U.S. Pat. No. 4,508,634 (Elepano et al.) teaches the use of a composition suitable for removing paint from skin comprising propylene carbonate, at least one organic cosolvent, at least one thickening agent, at least one buffering agent, at least one surfactant and water. U.S. Pat. No. 4,780,235 (Jackson) teaches the use of a paint remover which comprises (a) at least one $C_1$–$C_4$ dialkyl ester of a $C_4$–$C_6$ aliphatic ester, (b) an activator, (c) a surfactant and (d) at least one nonhalogen containing organic solvent such as N-methyl-2-pyrrolidone. U.S. Pat. No. 5,030,290 (Davis) teaches the use of a paint stripper comprising (a) a high molecular weight polymeric resin such as polyvinyl formal resin, (2) a plasticizer such as a dibasic ester and (3) a solvent which can be butyrolactone. U.S. Pat. No. 5,035,829 (Suwala) teaches the use of paint removing comprising an organic acid, an alkylene glycol and a $\gamma$-lactam or $\gamma$-lactone. While the Palmer, Davis and Suwala compositions have overcome some of the problems associated with the second class of removers, these compositions have either not been as effective as the solvent based paint and/or coating removers or have retained some of the adverse effects of the solvent based systems.

The third class of chemical compositions used to remove coatings generally comprises waterbased systems. An example of such a system is U.S. Pat. No. 4,927,556 (Pokorny) which discloses the use of a composition used to remove coatings from surfaces consisting essentially of water, at least one dibasic ester and at least one water soluble thickening agent. Although eliminating many of the problems associated with solvents such as toxicity, the Pokorny composition did not perform as fast as solvent based systems.

Thus, there currently exists a need for a coating remover which is fast and effective and yet, does not exhibit many of the adverse effects associated with alkali or solvent based compositions.

SUMMARY OF THE INVENTION

The present invention comprises a composition which can quickly and effectively remove coatings from substrates. In addition, this composition eliminates many of the adverse effects associated with alkali or solvent based compositions.

The composition comprises at least one lactone, preferably selected from the group comprising $\beta$-lactones, $\gamma$-lactones, $\delta$-lactones, $\epsilon$-lactones and mixtures thereof and at least one ester, preferably selected from the group comprising aliphatic esters or aromatic esters and mixtures thereof. If desired, water, aromatic solvents, organic solvents, surfactants, thickeners, corrosion inhibitors, fragrances or other additives can be added to the composition.

The present invention also includes a method of removing a coating from a substrate utilizing the composition of the present invention.

DETAILED DESCRIPTION OF THE INVENTION

The composition of the present invention is used to remove coatings from substrates and comprises at least one lactone and at least one ester. Optionally, water, aromatic solvents, organic solvents, surfactants, thickeners, corrosion inhibitors, fragrances and/or other additives can be added.

Lactones are cyclic esters in which the number of atoms constituting a main ring including a functional ester group is 4 to 7, two of which are provided by the ester group (—CO—O—). The different types of lactones are known as $\beta$-lactone (4 member ring), $\gamma$-lactone (5 member ring), $\delta$-lactone (6 member ring) and $\epsilon$-lactone (7 member ring). Suitable lactones include, but are not limited to, $\beta$-propiolactone, $\beta$-butyrolactone, 4-hydroxy-3-pentenoic acid $\gamma$-lactone, 4-hydroxy-3-pentenoic acid $\gamma$-lactone, $\gamma$-butyrolactone, $\gamma$-crotonolactone, $\gamma$-valerolactone, $\gamma$-caprolactone, $\delta$-valerolactone and $\epsilon$-caprolactone.

In order to form the composition of the present invention, the lactone is mixed with at least one ester. Generally, any ester can be used with the lactones. Suitable esters include, but are not limited to, aliphatic and aromatic esters.

Esters of aliphatic acids include simple esters prepared by reacting a precursor alcohol such as a mono-, di- or polyhydric alcohol with an organic acid such as a mono-, di- or polycarboxylic acid. Among the suitable precursor alcohols are linear alcohols, branched alcohols and oxo alcohols which are defined as a mixture of linear and methyl branched alcohols which have an oxygen group attached to the backbone. Examples of such reaction products include formic acid esters such as methyl and ethyl formate, glycol acetates, glycerol acetates, linear acetic acid esters such butyl acetate and amyl acetate and oxo alcohol acetic acid esters such as oxohexyl acetate. Other examples include butyric acid esters and propionic acid esters.

Another suitable group of aliphatic acid esters are the dibasic acid esters. Dibasic acid esters can include aliphatic diesters having a molecular weight up to about 200. These diesters are well known in the art and are commercially available as DuPont Dibasic Esters (DBEs), sold by the E.I. du Pont Nemours and Co. Dibasic esters that are preferred for the composition of the present invention are esters from adipic acid ($COOH(CH_2)_4COOH$), glutaric acid ($COOH(CH_2)_3COOH$) and succinic acid ($COOH(CH_2)_2COOH$). Both dimethyl and diethyl esters of these acids can be used effectively in the composition of this invention.

Aromatic acid esters useful for the purposes of this invention include simple esters prepared by reacting a precursor alcohol with an acid such as a benzoic or phthalic acid. Suitable aromatic acid esters include, but are not limited, to benzoic acid esters and esters of dibasic and polybasic aromatic acids such as phthalic and terephthalic acid esters.

Although water has been observed to reduce the effectiveness of water-miscible solvent based compositions used as a coating removers, it has been unexpectedly observed that there is little reduction in the overall effectiveness of the lactone/ester composition if water is added to the composition. Therefore, water can be added to the composition if desired in an amount where the composition remains stable.

Aromatic hydrocarbons can also be added to the composition. Aromatic hydrocarbons can be added in order to reduce the cost of the composition and to adjust the evaporation rates of the composition. Examples of aromatic hydrocarbons which can be used include, toluene, xylene and naphthalene. Especially preferred aromatic hydrocarbons include: (a) a blend of aromatic distillates containing xylene, cumene and trimethyl benzene sold under the tradename Hi Sol 10 and commercially available from Ashland Chemical Company or under the tradename Aromatic 100 commercially available from Exxon Company, (b) a blend of aromatic distillates containing naphthalene and trimethyl benzene sold under the tradename Hi Sol 15 by Ashland Chemical Company or under the tradename Aromatic 150 by the Exxon Company, and (c) an aromatic solvent blend of hydrocarbons containing naphthalene and consisting predominantly of $C_9$–$C_{15}$ aromatic hydrocarbons sold under the tradename Aromatic 200 by the Exxon Company.

If desired, organic solvents can be also added to the composition. Any organic solvent can be used as long as the composition remains stable. Examples of suitable solvents include ketones, aldehydes and alcohols.

Generally, thickening agents are added to the composition in order to stabilize the composition and provide good flow control. For example, the presence of a thickening agent allows the composition to be applied easily, level out and have the ability to cling to vertical surfaces. Suitable thickening agents include gums, polyvinyl alcohol, starches, clay derivatives, e.g., amine treated magnesium aluminum silicate, and cellulose derivatives, e.g., hydroxypropyl methylcellulose and waxes, e.g., amidized waxes, castor oil derivatives. Preferably, the thickener comprises a system consisting of a clay derivative sold under the tradename Bentone 27 sold by Rheox Inc., located in Heightstown, N.J., an amide wax sold under the tradename Crayvallac Super by Cray Valley Products, Inc. of Stuyvesyant, N.Y. and a hydroxypropyl cellulose sold under the tradename Methocel 240 commercially available by Dow Chemical Corp.

A surfactant is typically added to the composition to improve the stability of the composition. Any surfactant which helps to improve the stability of the composition can be utilized although it is preferred that non-ionic surfactants be utilized. Especially preferred surfactants should have a hydrophilic-lipophilic balance (HLB) of about 10. Examples of suitable surfactants would include a blend of Span 80, a sorbitan monooleate available from ICI Americas, Inc. and Tween 80, a polyoxyethylene 20 sorbitan monooleate also commercially available from ICI Americas, Inc.

Other additives can also be added. Examples of additives which can be added include corrosion inhibitors, fragrances, abrasive particles and colorants. Corrosion inhibitors help to protect metal containers from pitting and rusting while in contact with the composition of the present invention. Examples of corrosion inhibitors include aromatic phosphate esters sold under the tradename Maphos JM-51 from PPG/Mazer or carboxylic acid salts available as Hamposyl L-30 from W. R. Grace & Company. Fragrances can be added to mask and/or improve the solvent odor of the composition. Abrasive particles physically assist in the mechanical removal of a coating. If desired, colorants such as pigments, i.e., iron oxide pigments, and dyes, i.e., oil soluble dyes can also be added.

The amounts of the lactones and esters vary in the composition according to use. For optimum results, the composition comprises from about 90 to about 10 percent by weight lactone and from about 10 to about 90 percent by weight ester. If water is added to the composition, the amount of lactone varies from about 10 to about 40 percent by weight lactone, from about 10 to about 80 percent by weight ester and up to about 50 percent by weight water. More preferably, if water is added to the composition, the amount of lactone varies from about 10 to about 40 percent, from about 15 to about 75 percent by weight ester and from about 5 to about 35 percent by weight water. If aromatic hydrocarbons are added, the composition comprises from about 10 to about 30 weight percent lactone, from about 10 to about 35 percent by weight ester, from about 0 to about 30 percent by weight water and from about 10 to about 55 weight percent aromatic hydrocarbon. More preferably, if aromatic hydrocarbons are added, the composition comprises from about from about 20 to about 30 weight percent lactone, from about 15 to about 35 percent by weight ester, from about 0 to about 30 percent by weight water and from about 20 to about 40 weight percent aromatic hydrocarbon.

The composition of this invention can be prepared in a number of ways. A preferred method includes first mixing at least one lactone with at least one ester in a dispersator equipped with a Cowles blade sold by Cowles. At the same time, a surfactant can be added to the composition. If desired, a thickener is slowly sifted into the composition. Finally, water can be added to the composition.

The composition can be applied to a coating in any conventional manner such as by brush or roller, by spraying the composition onto the coating or by dipping the coating. However, it should be coated onto the substrate in amount sufficient to remove the coating. The amount of composition applied varies according to use and can be tailored to the user's preference. After application, the composition penetrates into the coating and either dissolves the coating or swells the coating to several times its original volume. The coating then either softens, wrinkles, bubbles and blisters resulting in its release from the substrate. After softening or blistering, the coating is removed from the substrate.

The following examples are set forth to illustrate this invention and are not intended to limit the scope of this invention thereof.

TEST METHODS

COATING REMOVAL

The ability of a composition to remove a coating is tested by applying a composition onto a coated sample. The composition is allowed to loosen the coating material and upon loosening, the material is removed from the sample by wiping or gently scraping it with a wooden tongue depressor. The time period to remove the coating(s) is then recorded.

VERTICAL CLING

The ability of a paint stripper to cling to a vertical surface is conducted in accordance with a modified version of the American Society for Testing and Materials Test D2202-84 entitled "Slump of Caulking Compounds and Sealants" described in Volume 4.07 entitled Building Seals and Sealants; Fire Standards; Building Constructions of the 1987 Annual Book of Standards. A test jig constructed in accordance with the description in Test D2202-84 is cleaned with a solvent and then placed face upward. The coating remover composition is poured into the jig cavity flush with the surface of the jig. The jig is turned over and placed in a vertical position. Readings are taken at five minutes and measured in milliliters to observe the slump of the coating remover compositions.

TEST SAMPLES

The samples used in the Examples 1-31 and Comparative Examples 1-16 are commercially available from Advanced Coating Technologies, Inc. of Hillsdale, Mich. and were prepared by coating phosphate E treated cold rolled steel with primer PPG-80-703F commercially available from PPG Industries and then top coated with white automotive lacquer sold as PPG-WALM-3967 by PPG Industries per General Motors Specification 9984052. After being coated, the panels were baked and then aged for at least four months before being tested.

EXAMPLE 1

The test sample of Example 1 was prepared in the following manner:

40.6 gms. of γ-butyrolactone, 40.6 gms of butyl acetate, 0.11 gms. of Tween 80 and 0.09 gms. of Span 80 were blended together in a dispersator fitted with a Cowles blade. Once blended together, 1.5 gms. of Crayvallac Super, 0.5 gms. of Methocel 240 and 1.5 gms. of Bentone 27 were slowly sifted into the mixture. 15.1 gms. of water was then added to the mixture and the mixture was thoroughly mixed. The resultant mixture was then coated onto a test sample and tested. The ingredients used, weight percentage of the ingredients and test results are reported in Table 1.

EXAMPLES 2-4

These examples, all of which were prepared utilizing the methods described in Example 1, illustrate various compositions found within the scope of the present invention. Examples 2-4 varied from Example 1 in that different esters were utilized. The esters used, the ingredients and the weight percentage of the ingredients utilized and test results are reported in Table 1.

TABLE 1

|  | Example 1 | Example 2 | Example 3 | Example 4 |
| --- | --- | --- | --- | --- |
| γ-butyrolactone | 40.60 | 40.60 | 40.60 | 40.60 |
| butyl acetate | 40.60 | — | — | — |
| oxohexyl acetate | — | 40.60 | — | — |
| DBE[1] | — | — | 40.60 | — |
| methyl benzoate | — | — | — | 40.60 |
| Tween 80 | 0.11 | 0.11 | 0.11 | 0.11 |
| Span 80 | 0.09 | 0.09 | 0.09 | 0.09 |
| Crayvallac Super | 1.50 | 1.50 | 1.50 | 1.50 |
| Methocel 240 | 0.50 | 0.50 | 0.50 | 0.50 |
| Bentone 27 | 1.50 | 1.50 | 1.50 | 1.50 |
| Water | 15.10 | 15.10 | 15.10 | 15.10 |
| Removal Time (Mins.) | 5 | 5 | 12 | 5 |

[1]DBE is a dibasic ester blend sold by the E. I. du Pont Nemours and Co.

EXAMPLE 5

The test sample of Example 5 illustrates the addition of an aromatic hydrocarbon to the composition. It was prepared in the following manner:

15 gms. of γ-butyrolactone, 20 gms of DBE, and 48.75 gms. of Hi Sol 15 were blended together in a dispersator fitted with a cowles blade. Once blended together, 1.25 gms. of Methocel 240 and 5 gms. of Bentone 27 were slowly sifted into the mixture. 10 gms. of water was then added to the mixture and the mixture is thoroughly mixed. The mixture was then coated onto a test sample and tested in accordance with the procedures outlined above. The primer and the automotive lacquer were removed from the test sample in ten minutes.

EXAMPLES 6-8

Examples 6-8, all of which were prepared utilizing the methods described in Example 1, illustrate compositions utilizing different lactones and esters which are found within the scope of the present invention. The ingredients used, weight percentage of the ingredients and test results are reported in Table 2.

TABLE 2

|  | Example 6 | Example 7 | Example 8 |
|---|---|---|---|
| γ-butyrolactone | 22.00 | — | — |
| δ-valerolactone | — | 15.00 | — |
| ε-caprolactone | — | — | 44.40 |
| DBE | 71.80 | 68.8 | — |
| butyl acetate | — | — | 44.40 |
| Tween 80 | 0.11 | 0.11 | 0.11 |
| Span 80 | 0.09 | 0.09 | 0.09 |
| Methocel 240 | 1.00 | 1.00 | 1.00 |
| Bentone 27 | 5.00 | 5.00 | 5.00 |
| Water | — | 10.00 | 5.00 |
| Removal Time (Mins.) | 12 | 15 | 11 |

EXAMPLES 9-16

Examples 9-16 were prepared utilizing the methods described in Example 1. These two examples illustrate various combinations of lactones, esters, surfactants, aromatics, thickeners and water. The ingredients used, weight percentage of the ingredients and test results are reported in Table 3.

TABLE 3

|  | Ex. 9 | Ex. 10 | Ex. 11 | Ex. 12 | Ex. 13 | Ex. 14 | Ex. 15 | Ex. 16 |
|---|---|---|---|---|---|---|---|---|
| γ-butyrolactone | 8.4 | 42.0 | 22.0 | 10.0 | 32.0 | 10.0 | 20.0 | 14.0 |
| butyl acetate | 75.6 | 42.0 | — | — | 32.0 | 10.0 | 29.0 | 17.0 |
| DBE | — | — | 61.8 | 33.8 | — | — | — | — |
| Tween 80 | — | — | 0.11 | 0.11 | 0.14 | 0.14 | — | 0.11 |
| Span 80 | — | — | 0.09 | 0.09 | 0.11 | 0.11 | — | 0.09 |
| Methocel 240 | 1.0 | 1.0 | 1.0 | 1.0 | 1.0 | 1.0 | 1.0 | 1.0 |
| Bentone 27 | 5.0 | 5.0 | 5.0 | 5.0 | 3.5 | 3.5 | 5.0 | 4.0 |
| water | 10.0 | 10.0 | 10.0 | 40.0 | 20.0 | 20.0 | 10.0 | 50.0 |
| Hi Sol | — | — | — | — | 10.0 | 55.0 | 35.0 | 13.8 |
| Removal Time (Mins.) | 10 | 5 | 10 | >15 | 6 | 20 | 5 | 15 |

EXAMPLES 17-28

Examples 17-28 were prepared utilizing the methods described in Example 1 except that only two components were utilized, lactone and ester. The lactones and esters used, the weight percentage of these two ingredients and test results are reported in Table 4.

TABLE 4

| Ex. | Lactone | Ester(s) | Wt. % | Removal Time (mins.) |
|---|---|---|---|---|
| 17 | γ-butyrolactone | propylene glycol methyl ether acetate | 50/50 | 10 |
| 18 | γ-butyrolactone | butyl acetate | 50/50 | 5 |
| 19 | γ-butyrolactone | methyl benzoate | 50/50 | 10 |
| 20 | γ-butyrolactone | amyl acetate | 50/50 | 5 |
| 21 | δ-valerolactone | butyl acetate | 50/50 | 11 |
| 22 | γ-butyrolactone | oxooctyl acetate | 50/50 | 13 |
| 23 | γ-butyrolactone | oxononyl acetate | 50/50 | 15 |
| 24 | γ-butyrolactone | dipropylene glycol methyl ether acetate | 50/50 | 17 |
| 25 | γ-butyrolactone | 2-ethyl-ethoxy-propionate | 50/50 | 7 |
| 26 | γ-butyrolactone | ethyl lactate | 50/50 | 13 |
| 27 | γ-butyrolactone | DBE | 10/90 | 15 |
| 28 | γ-butyrolactone | butyl acetate | 90/10 | 9 |

COMPARATIVE EXAMPLE 1

Comparative Example 1 which was prepared according to the instructions outlined in U.S. Pat. No. 5,035,829 was made by mixing 32 gms. of n-methyl-2-pyrrolidone, 42 gms. of propylene glycol methyl ether, 26 gms. of acetic acid, 2 gms. of alkylphenoxypoly(oxyethylene) ethanol sold under the tradename Igepal CO-710 by Rhone-Poulenc, 2.0 gms. of triethanol amine and 0.9 gms. of hydroxypropyl cellulose sold under the tradename Klucel H sold by Hercules Inc. together and then coating it onto a test sample. The test sample was then tested in accordance with the test procedures outlined above. The primer and automotive lacquer were removed in 50 minutes.

COMPARATIVE EXAMPLE 2

Comparative Example 2 which was prepared according to the instructions outlined in U.S. Pat. No. 5,035,829 was made by mixing together 40 gms. of n-methyl-2-pyrrolidone, 40 gms. of tripropylene glycol methyl ether, 12 gms. acetic acid, 4 gms. formic acid, 2 grams of Igepal CO-710, 2 gms. of triethanol amine and 0.8 gms. of Klucel H. This mixture was then coated onto a test sample and tested with the aforementioned procedures. In a period of 60 minutes, not even the top paint layer was removed.

COMPARATIVE EXAMPLES 3-13

Comparative Examples 3-13 examined the ability of individual lactones or esters to remove a coating. The component used alone, the test results of the component and test results of a composition of the present invention comprising 50 weight percent component and 50 weight percent γ-butyrolactone are reported in Table 5.

TABLE 5

| Comparative Example | Component | Removal Time (mins.) | Removal Time (mins.) 50 wt. % γ-butyrolactone |
|---|---|---|---|
| C-3 | γ-butyrolactone | 10 | — |
| C-4 | butyl acetate | 9 | 5 |
| C-5 | amyl acetate | evapo- | 5 |

TABLE 5-continued

| Comparative Example | Component | Removal Time (mins.) | Removal Time (mins.) 50 wt. % γ-butyrolactone |
|---|---|---|---|
| | | rated | |
| C-6 | 2-ethyl-ethoxypropionate | 25 | 7 |
| C-7 | methyl benzoate | >15 | 10 |
| C-8 | PMA[2] | 35 | 10 |
| C-9 | Exxate 800[3] | >60 | 13 |
| C-10 | ethyl lactate | 25 | 13 |
| C-11 | Exxate 900[4] | >60 | 15 |
| C-12 | DBE | 25 | 15 |
| C-13 | DPMA[5] | >60 | 17 |

[2]PMA is a propylene methyl ether acetate available from Dow Chemical Corporation
[3]Exxate 800 is a oxyoctyl acetate sold by Exxon Company
[4]Exxate 900 is a oxynonyl acetate sold by Exxon Company
[5]DPMA is a dipropylene glycol methyl ether acetate sold by Dow Chemical Corporation

EXAMPLES 29-31 AND COMPARATIVE EXAMPLES 14-16

Examples 29-31 and Comparative Examples 14-16 examined the vertical cling of the composition of the present invention and several solvent based compositions outside the scope of the present invention. The samples were prepared in accordance with the methods described in Example 1 and were tested for vertical cling. The components, the weight percentage of the components and the vertical cling test results are reported in Table 6.

TABLE 6

| | Ex. 29 | Ex. 30 | Ex. 31 | C-14 | C-15 | C-16 |
|---|---|---|---|---|---|---|
| γ-butyrolactone | 15.00 | — | 32.00 | — | — | — |
| ε-caprolactone | — | 44.40 | — | — | — | — |
| butyl acetate | — | 44.40 | 32.00 | — | — | — |
| DBE | 20.00 | — | — | — | — | — |
| Tween 80 | — | 0.11 | 0.14 | — | — | — |
| Span 80 | — | 0.09 | 0.11 | — | — | — |
| Methocel 240 | 1.25 | 1.00 | 1.00 | — | — | — |
| Bentone 27 | 5.00 | 5.00 | 3.50 | — | — | — |
| Water | 10.00 | 5.00 | 20.00 | — | — | — |
| Hi Sol 15 | 48.75 | — | 10.00 | — | — | — |
| Bix[R] [7] | — | — | — | 100 | — | — |
| Wood Finisher's Pride ™ [8] | — | — | — | — | 100 | — |
| Zip Strip[R] [9] | — | — | — | — | — | 100 |
| Slump (mm/5 mins.) | 0 | 16 | 20 | 100+ | 100+ | 100+ |

[7]Bix[R] Stripper is a product commercially available from Bix Manufacturing Company, Inc.
[8]Wood Finisher's Pride ™ Paint Stripping Gel is distributed by the Scott Paper Company
[9]Zip Strip[9] Paint-Varnish and Finish Remover is sold by the Star Bronze Company.

It should be noted that the compositions of Comparative Examples 14-16 slumped beyond 100 mm. in less than thirty seconds.

EXAMPLES 32-37

Examples 32-37 explore the effect of the composition of the present invention on various types of coatings. Coatings were applied per manufacturer's directions to a ¼ in. (0.64 cm.) board. The coatings were dried and then baked at 120° F. (48.9° C.) for two weeks. The coated boards were further aged for a year at ambient conditions prior to testing. The ingredients used, the weight percentages, the type of coating, the number of coats removed and the removal time are reported in Table 7.

TABLE 7

| | Ex. 32 | Ex. 33 | Ex. 34 | Ex. 35 | Ex. 36 | Ex. 37 |
|---|---|---|---|---|---|---|
| γ-butyrolactone | 15.0 | 15.0 | 20.0 | 15.0 | 8.4 | 20.0 |
| butyl acetate | — | — | 29.0 | — | 75.6 | 29.0 |
| DBE | 20.0 | 20.0 | — | 20.0 | — | — |
| Methocel 240 | 1.25 | 1.25 | 1.0 | 1.25 | 1.0 | 1.0 |
| Bentone 27 | 5.0 | 5.0 | 5.0 | 5.0 | 5.0 | 5.0 |
| Water | 10.0 | 10.0 | 10.0 | 10.0 | 10.0 | 10.0 |
| Hi Sol 15 | 48.75 | 48.75 | 35.0 | 48.75 | — | 35.0 |
| Latex Paint[10] | X | | | | | |
| Oil-Based Paint[11] | | X | X | | | |
| Polyurethane[12] | | | | X | | |
| Lacquer[13] | | | | | X | X |
| Number of Coats | 6 | 2 | 2 | 3 | 3 | 3 |
| Removal Time (mins.) | 6 | 30 | 25 | 7 | 2 | 2 |

[10]The latex paint comprised Glidden Spread Satin[R] Latex wall paint sold by Glidden-Durkee, a Div. of SCM Corp.
[11]The oil based paint comprised Glidden Spred Lustre[R] Alkyd semi-gloss enamel manufactured by Glidden-Durkee, a Div. of SCM Corp.
[12]The polyurethane comprised Minwax Fast Dry Polyurethane, gloss sold by Sterling Drug, Inc.
[13]The lacquer comprised Parks Lacquer, satin commercially available from Parks Corporation of Somerset, Minnesota.

Samples treated with the composition of the present invention performed better than samples not treated with the composition of the present invention as illustrated by Comparative Examples 1, 2, 14, 15 and 16. Moreover, compositions of the present invention showed a synergistic effect in the removal time of a coating when compared to either an ester or lactone when used alone as shown in Comparative Examples 3-13. In addition, there was little reduction in the effectiveness of the composition when water was added to the composition. Similarly, the addition of an aromatic hydrocarbon did not reduce the effectiveness of the performance of the composition. Thus, the Examples show that effective performance could be obtained with the composition of the present invention.

In summary, a novel and unobvious composition utilized to remove coatings has been described. Although specific embodiments and examples have been disclosed herein, it should be borne in mind that these have been provided by way of explanation and illustration and present invention is not limited thereby. Certainly modifications which are within the ordinary skill in the art are considered to lie within the scope of this invention as defined by the following claims including all equivalents.

I claim:
1. A composition for removing coatings comprising:
   a. about 10 to about 40 percent by weight of a lactone based on the total weight of said composition;
   b. about 10 to about 80 percent by weight of an ester based on the total weight of said composition, said ester being other than ethyl acetate and not involving intramolecular condensation of a carboxylic acid moiety and an alcohol moiety; and
   c. water in an amount of up to about 50 percent by weight based on the total weight of said composition; wherein said composition is essentially free of sodium hypochlorite and essentially free of carboxylic acid.

2. A composition according to claim 1, wherein said lactone, said ester and said water are present in amounts of about 10 to about 40, about 15 to about 75 and about 5 to about 35 percent by weight, respectively, all based on the total weight of said composition.

3. A composition according to claim 1, further comprising an aromatic hydrocarbon and wherein the amounts of said lactone, said ester, said water and said aromatic hydrocarbon are from about 10 to about 30, from about 10 to about 35, up to about 30 and about 10 to about 55 percent by weight, respectively, all based on the total weight of said composition.

4. A composition according to claim 3, wherein said lactone, said ester, said water and said aromatic hydrocarbon are present in amounts from about 20 to about 30, from about 15 to about 35, up to about 30, and from about 20 to about 40 percent by weight, respectively, all based on the total weight of said composition.

5. A composition according to claim 1, wherein said lactone is selected from the group consisting of $\beta$-propiolactone, $\beta$-butyrolactone, 4-hydroxy-3-pentenoic acid $\gamma$-lactone, 4-hydroxy-3-pentenoic acid $\gamma$-lactone, $\gamma$-butyrolactone, $\gamma$-crotonolactone, $\gamma$-valerolactone, $\gamma$-caprolactone, $\delta$-valerolactone and $\epsilon$-caprolactone.

6. A composition according to claim 1, wherein said ester is selected from the group consisting of an aliphatic dibasic acid ester and an aromatic acid ester.

* * * * *